(12) United States Patent
Elliott

(10) Patent No.: US 9,946,033 B2
(45) Date of Patent: Apr. 17, 2018

(54) FIBER OPTIC CONNECTOR WITH ADHESIVE MANAGEMENT

(71) Applicant: Corning Optical Communications LLC, Hickory, NC (US)

(72) Inventor: Kevin Eugene Elliott, Horseheads, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/014,125

(22) Filed: Feb. 3, 2016

(65) Prior Publication Data

US 2016/0154189 A1 Jun. 2, 2016

Related U.S. Application Data

(63) Continuation of application No. PCT/US2014/049089, filed on Jul. 31, 2014.

(30) Foreign Application Priority Data

Aug. 7, 2013 (EP) .................................... 13179601

(51) Int. Cl.
*G02B 6/36* (2006.01)
*G02B 6/38* (2006.01)
*G02B 6/32* (2006.01)

(52) U.S. Cl.
CPC .......... *G02B 6/3833* (2013.01); *G02B 6/325* (2013.01); *G02B 6/3839* (2013.01); *G02B 6/3853* (2013.01); *G02B 6/3861* (2013.01); *G02B 6/3652* (2013.01); *G02B 6/3885* (2013.01)

(58) Field of Classification Search
CPC .... G02B 6/325; G02B 6/3833; G02B 6/3838; G02B 6/3839; G02B 6/3853–6/3855; G02B 6/3861
USPC ........................ 385/78–80, 92, 60, 61, 72–74
See application file for complete search history.

(56) References Cited

U.S. PATENT DOCUMENTS

| | | | | |
|---|---|---|---|---|
| 4,824,202 A | * | 4/1989 | Auras .................. | G02B 6/3843 385/92 |
| 4,880,290 A | * | 11/1989 | Kumazawa ............ | G02B 6/245 385/95 |
| 6,101,703 A | * | 8/2000 | Odanaka .................. | A61B 1/07 29/447 |

(Continued)

FOREIGN PATENT DOCUMENTS

| CA | 2278081 A1 | 1/2001 |
|---|---|---|
| EP | 1451584 B1 | 5/2011 |

(Continued)

OTHER PUBLICATIONS

Patent Cooperation Treaty, International Search Report for PCT/US14/049089, dated Sep. 30, 2014, 4 pages.

(Continued)

*Primary Examiner* — Robert Tavlykaev
(74) *Attorney, Agent, or Firm* — Michael E. Carroll, Jr.

(57) ABSTRACT

A fiber optic connector includes a ferrule configured to receive and support one or more optical fibers and at least one component coupled to a surface of the ferrule by an adhesive. The at least one component overlays a footprint area defined on the surface to which the adhesive is applied, and the surface has a plurality of recessed formations within the footprint area to accommodate the adhesive.

15 Claims, 8 Drawing Sheets

(56) References Cited

U.S. PATENT DOCUMENTS

| | | | |
|---|---|---|---|
| 7,578,625 B2* | 8/2009 | Tanaka | G02B 6/3636 385/52 |
| 2002/0114589 A1 | 8/2002 | Igl et al. | |
| 2003/0152343 A1* | 8/2003 | Yamada | G02B 6/3636 385/99 |
| 2005/0254770 A1* | 11/2005 | Watanabe | G02B 6/30 385/137 |
| 2006/0245694 A1* | 11/2006 | Chen | G02B 6/32 385/71 |
| 2008/0008419 A1* | 1/2008 | Krahenbuhl | G02B 6/32 385/33 |
| 2014/0105543 A1* | 4/2014 | de Jong | G02B 6/3853 385/77 |
| 2014/0241672 A1* | 8/2014 | Isenhour | G02B 6/4206 385/79 |
| 2015/0003783 A1* | 1/2015 | Benjamin | G02B 6/3853 385/61 |
| 2016/0011372 A1* | 1/2016 | Barwicz | B29D 11/0075 385/139 |

FOREIGN PATENT DOCUMENTS

| | | | |
|---|---|---|---|
| GB | 2373063 A | 9/2002 | |
| JP | S5778505 A | 5/1982 | |
| WO | 2008/077195 A1 | 7/2008 | |
| WO | WO 2012/111650 A1 * | 8/2012 | G02B 6/40 |

OTHER PUBLICATIONS

EP Search Report issued in corresponding EP Appln. No. 13179601.3, dated Jan. 22, 2014 (7 pages).

PCT Written Opinion issued in corresponding PCT Appln. No. PCT/US14/049089, dated Sep. 30, 2014 (5 pages).

* cited by examiner

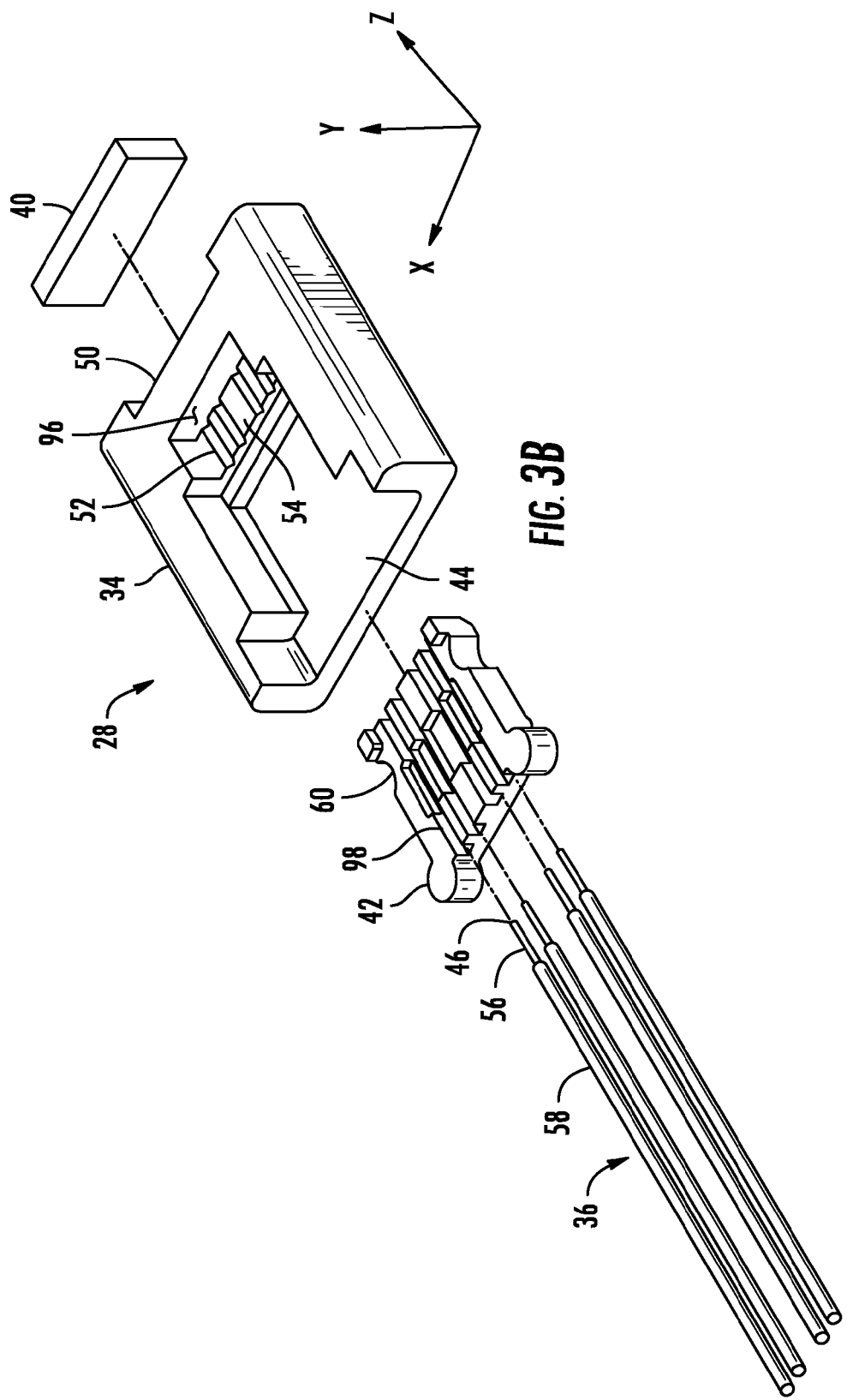

FIBER OPTIC CONNECTOR WITH ADHESIVE MANAGEMENT

RELATED APPLICATIONS

This application is a continuation of International Application No. PCT/US14/49089, filed on Jul. 31, 2014, which claims the benefit of priority under 35 U.S.C. § 119 of European Patent Application Serial No. 13179601.3 filed on Aug. 7, 2013, the content of which is relied upon and incorporated herein by reference in its entirety.

BACKGROUND

This disclosure relates generally to optical communication and, more particularly, to fiber optic connectors having one or more components attached to a ferrule with adhesive.

Over the past several decades, optical fiber has emerged as an alternative to copper wire for transmitting data in a wide variety of industries. Many industries that have traditionally relied on copper to transmit data are increasingly using optical fiber due, at least in part, to the extremely wide bandwidth and low noise associated with optical transmissions. For example, in the consumer electronics industry, short distance data links between electrical devices have reached data rates at which traditional copper cables have limited transmission distance and cable flexibility. Optical cable assemblies are being developed to meet these high demands, especially for devices used in video and storage applications.

Optical cable assemblies include a fiber optic connector on one or both ends of a cable that carries one or more optical fibers. One type of connector used in optical cable assembles for the consumer electronics industry and elsewhere is known as an expanded beam connector, an example of which is schematically illustrated in FIG. 1. In such a fiber optic connector, a ferrule aligns one or more optical fibers 10 with corresponding lens elements 12 provided on or in the ferrule. Each lens element 12 is configured to either: a) receive an optical signal diverging from an end the associated optical fiber positioned within the ferrule and collimate it into an expanded beam for receipt by a corresponding lens element of a mated connector or device, or b) receive an expanded beam of collimated light from a mated corrector or device and focus it into the associated optical fiber positioned within the ferrule.

Expanded beam connectors are typically designed so that the expanded beam travels through an air gap between mated connectors, thereby avoiding physical contact between corresponding lens elements. For example, the ferrule of a connector may be shaped to provide an air pocket or cavity 14 next to the lens elements 12 of the connector. A glass cover (or "window") 16 is typically positioned on the ferrule over the air cavity 14 because the lens elements 12 of the connector may be subjected to damage and contamination if left exposed and, as a result, negatively affect optical performance. The glass cover 16 is typically bonded to the ferrule using an adhesive. Applying the adhesive requires great care because the glass cover 16 must be precisely positioned without excess adhesive migrating to areas that might result in the adhesive interfering with the optical transmissions. This can be a difficult task due to the limitations of current adhesive dispensing systems.

SUMMARY

One embodiment of the disclosure relates to a fiber optic connector including a ferrule configured to receive and support one or more optical fibers. The fiber optic connector also includes at least one component coupled to a surface of the ferrule by an adhesive. The at least one component overlays a footprint area defined on the surface to which the adhesive is applied, and the surface has a plurality of recessed formations within the footprint area.

The at least one component may comprise a cover/window coupled to a forward-facing surface of the ferrule in some embodiments, one or more optical fibers coupled to one or more fiber support features on the ferrule in other embodiments, and a fiber tray or attachment ferrule received within a tray recess on the ferrule in still other embodiments. Embodiments with different components having one or more textured surfaces, including embodiments where the at least one component comprises combinations of the examples just mentioned, are also contemplated. Note that the fiber support features may be open grooves, such as u-shaped or v-shaped grooves.

An additional embodiment of the disclosure relates to a fiber optic connector having a ferrule extending along a longitudinal axis. The ferrule defines a forward surface extending in a transverse plane that intersects the longitudinal axis. The fiber optic connector also includes at least one lens element positioned on the ferrule and a window coupled to the forward-facing surface of the ferrule by an adhesive. The at least one lens element is recessed from the forward-facing surface so that an air gap is provided between the at least one lens element and the window. The window overlays a footprint area defined on the forward-facing surface of the ferrule, and a gap thickness is defined between the window and the transverse plane in which the forward-facing of the ferrule extends. The volume of adhesive coupling the window to the forward-facing is greater than a volume defined by the product of the gap thickness and footprint area.

Additional features and advantages will be set forth in the detailed description which follows. Additional features and advantages will also be readily apparent to those skilled in the art based on the description, or recognized by practicing the embodiments disclosed.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments. Persons skilled in the technical field of fiber optic connectors will appreciate how features and attributes associated with embodiments shown in one of the drawings may be applied to embodiments shown in others of the drawings.

BRIEF DESCRIPTION OF THE DRAWINGS

FIG. 3B is a rear perspective view of the fiber optic module and the plurality of optical fibers depicted in FIG. 3A also in a disassembled state;

DETAILED DESCRIPTION

Figure 1:
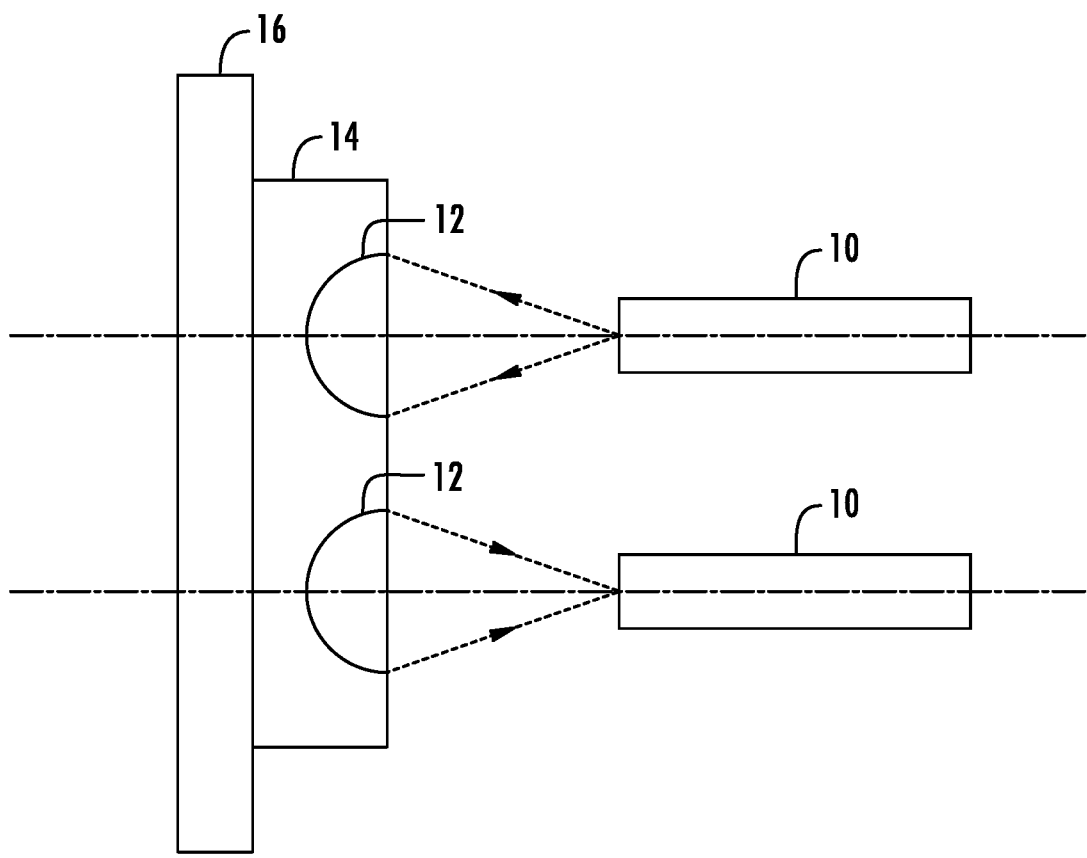
FIG. 1 is a schematic view of an exemplary expanded beam fiber optic connector.
Figure 2:
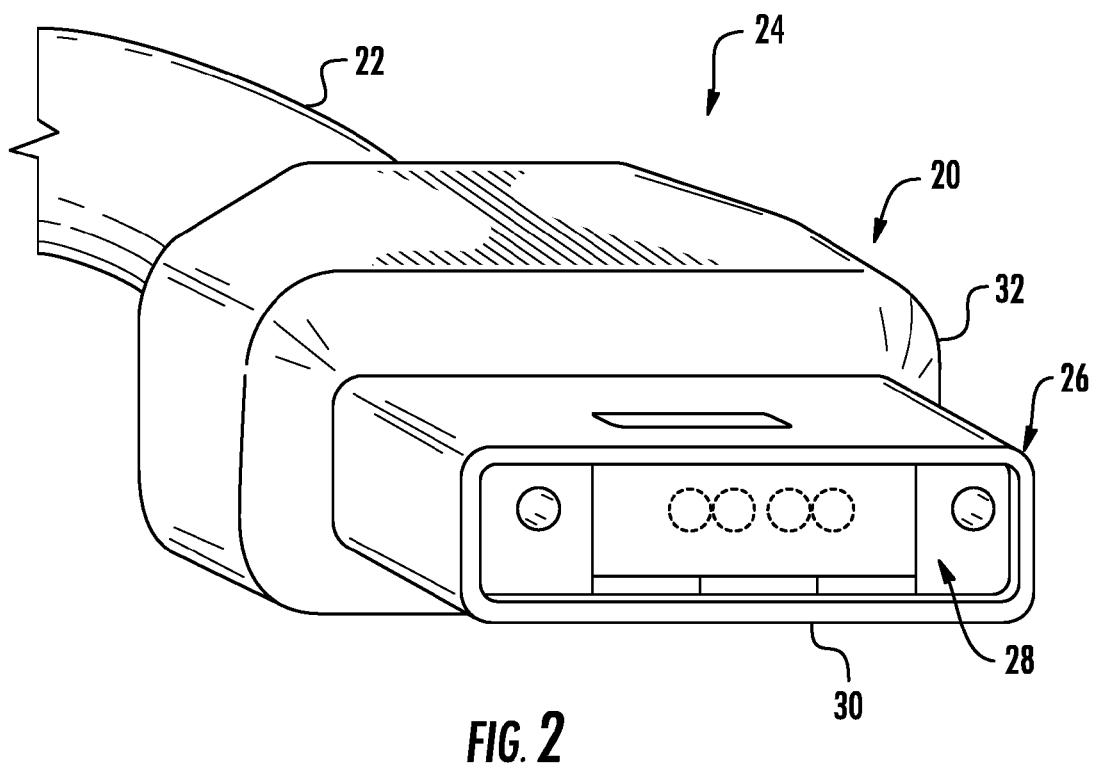
FIG. 2 is a perspective view of an example optical cable assembly according to one or more embodiments of the disclosure.
Figure 3A:
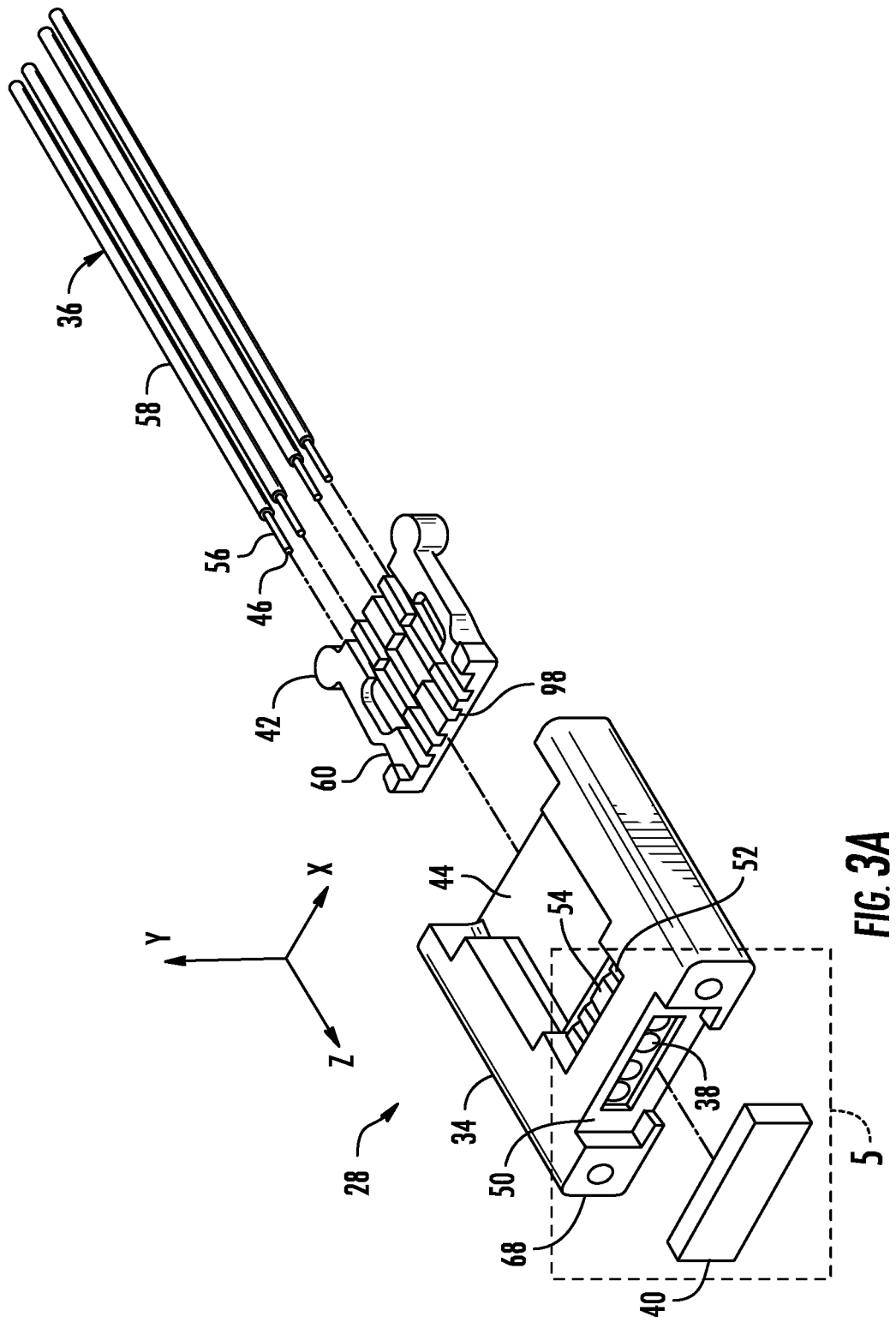
FIG. 3A is a front perspective view of an explanatory fiber optic module and a plurality of optical fibers in a disassembled state according to one or more embodiments of the disclosure.
Figure 4A:
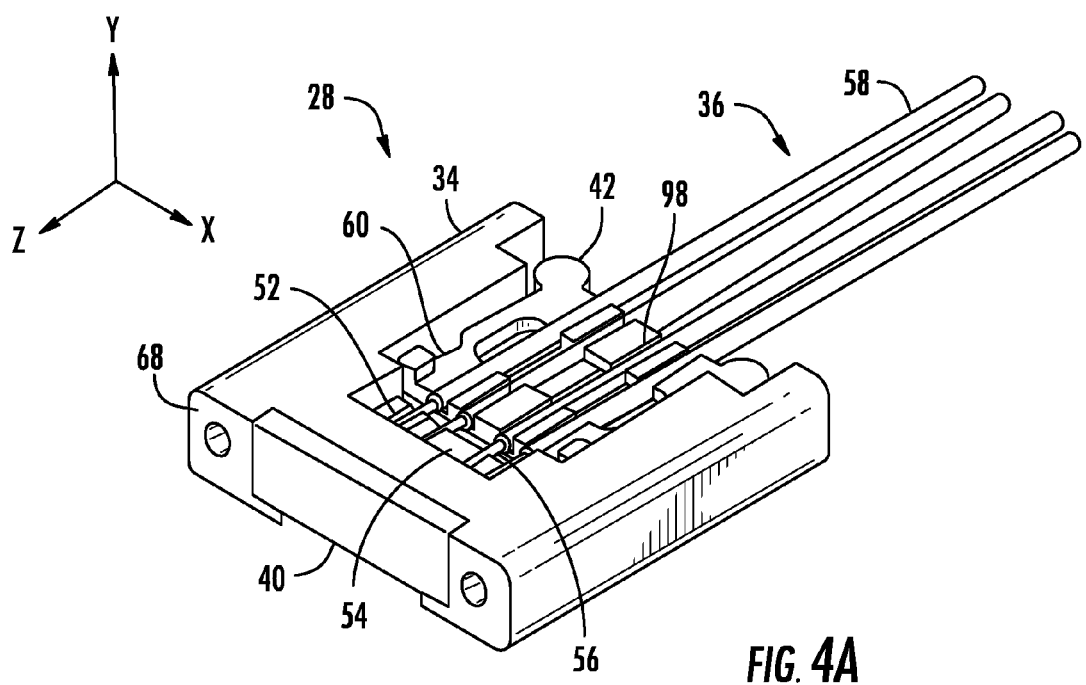
FIG. 4A is a front perspective view of the fiber optic module and the plurality of optical fibers depicted in FIG. 3A shown in an assembled state.
Figure 4B:
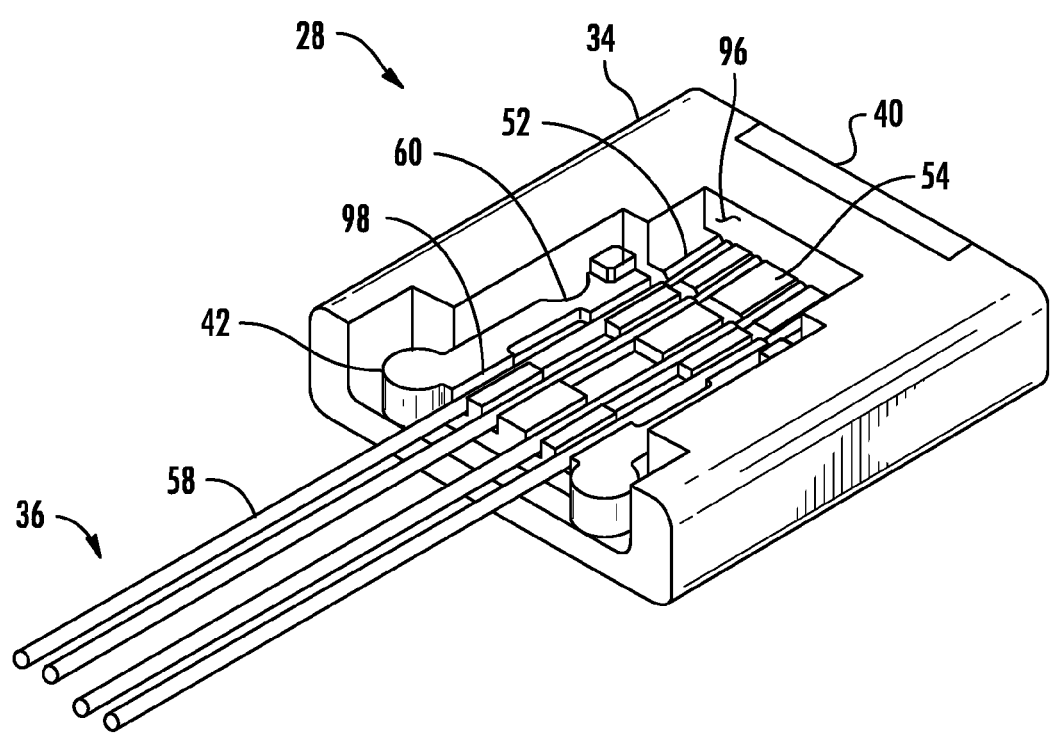
FIG. 4B is a rear perspective view of the assembled fiber optic module and plurality of optical fibers depicted in FIG. 4A.

Various embodiments will be further clarified by the following examples. To this end, FIG. 2 illustrates one example of a fiber optic connector 20 coupled to an end of an optical cable 22, thereby forming an optical cable assembly 24. Only one end of the optical cable assembly 24 is shown. At the end not shown, the optical cable assembly 24 may include another fiber optic connector 20.

The fiber optic connector 20 may be referred to as a device-to-device optical connector or optical-to-optical fiber optic connector because a first device (e.g., the fiber optic connector of the optical cable assembly) is configured to be optically coupled to a second device (not shown) by direct connection. The second device may be, for example, a fiber optic receptacle of an electronics device, such as a mobile phone, tablet, personal computer, media player, memory storage device, etc. Light signals may be passed between the coupled devices such that there is optical communication therebetween.

Still referring to FIG. 2, the fiber optic connector 20 includes a plug portion 26 extending from a connector body 32. The plug portion 26, which includes a fiber optic module 28 disposed within a plug housing 30, is configured to be inserted into the device to which the fiber optic connector 20 mates (e.g., a fiber optic receptacle of an electronics device or another optical cable assembly). FIGS. 3A, 3B, 4A, and 4B illustrate the fiber optic module 28 in further detail. In the embodiment shown, the fiber optic module 28 includes a plug ferrule element or body 34 (hereinafter "ferrule") that supports and aligns optical fibers 36 extending from the optical cable 22 (FIG. 2) with respective lens elements 38 (e.g., refractive lenses) provided on the ferrule 34. The fiber optic module 28 also includes a window or cover 40 coupled to the ferrule 34 over the lens elements 38 and a fiber tray 42 (i.e., an attachment ferrule) received and secured within a fiber tray recess 44 provided in the ferrule 34.

The fiber optic connector 20 may be referred to as an expanded beam connector in that the lens elements 38 collimate optical signals from an end 46 of each optical fiber 36 into expanded beams, or focus expanded beams received from the mating component into the end 46 of each optical fiber 36. The fiber optic connector 20 may also be referred to as a "windowed refractive connector" in that the lens elements 38 are spaced from the window 40 by an air gap such that a difference in refraction exists in the optical path at the lens elements 38. The lens elements 38 may be formed with the ferrule 34 or be separate components attached to the ferrule 34. The window 40 may be formed from any material transmissive to light in the wavelength of the optical signals passing to and/or from the lens elements 38. This includes, for example, glass and polymer. One specific example is chemically strengthened aluminoborosilicate glass. Additionally, in a manner not shown herein, the window 40 may include one or more anti-scratch and/or anti-reflective coatings/outer layers, along with any intermediate layers to bond or transition to such coatings/outer layers.

In general, the window 40 is coupled to a forward-facing surface 50 of the ferrule 34 with an adhesive (e.g., a heat-curable epoxy). The window 40 is maintained a specific distance from the lens elements 38 based on the design of the optical system. The optical fibers 36 are also coupled to the ferrule 34 with an adhesive (e.g., an index-matching epoxy), but the adhesive is applied to fiber support features 52 provided on a fiber support ledge 54. Each of the fiber support features 52, which in the embodiment shown are v-shaped grooves, supports a fiber core 56 that has been exposed by stripping away a coating 58 of the associated optical fiber 36. The fiber tray 42 is yet another component coupled to the ferrule 34 with an adhesive, with the adhesive being applied directly to the fiber tray recess 44 or allowed to flow thereto by features on the fiber tray (e.g., adhesive receiving features 60 that define recesses). Both the fiber tray 42 and fiber support features 53 play an important role in positioning the optical fibers 36 relative to the lens elements 38, which affects the performance of the optical system.

As can be appreciated, the window 40, fiber tray 42, and optical fibers 36 are examples of components coupled to the ferrule 34 by an adhesive. Although further details of these components will be described below, it should be noted that the configuration of the fiber optic connector 20 shown in FIGS. 2-4B is provided merely for illustrative purposes. The principles described may be applicable to other configurations of fiber optic connectors where components are coupled to a ferrule with adhesive. In some embodiments, for example, the ferrule 34 may support and align the optical fibers 36 relative to the lens elements 38 without the use of a fiber tray. Additionally, in some embodiments, there may be a different number of optical fibers 36 (compared to the embodiment shown) extending from the optical cable 22 and supported by the ferrule 34. This includes embodiments where the ferrule 34 supports a single fiber. The number of lens elements 38 may correspond to the number of optical fibers 36 and, therefore, may likewise be different. Furthermore, although the window 40 is depicted as being substantially sheet-like and having a uniform thickness, embodiments will be appreciated where some portions or substantially the entire window has a substantially non-uniform thickness. Embodiments will also be appreciated where the fiber optic connector 20 is not an expanded beam connector and/or windowed refractive connector.

Figure 5:
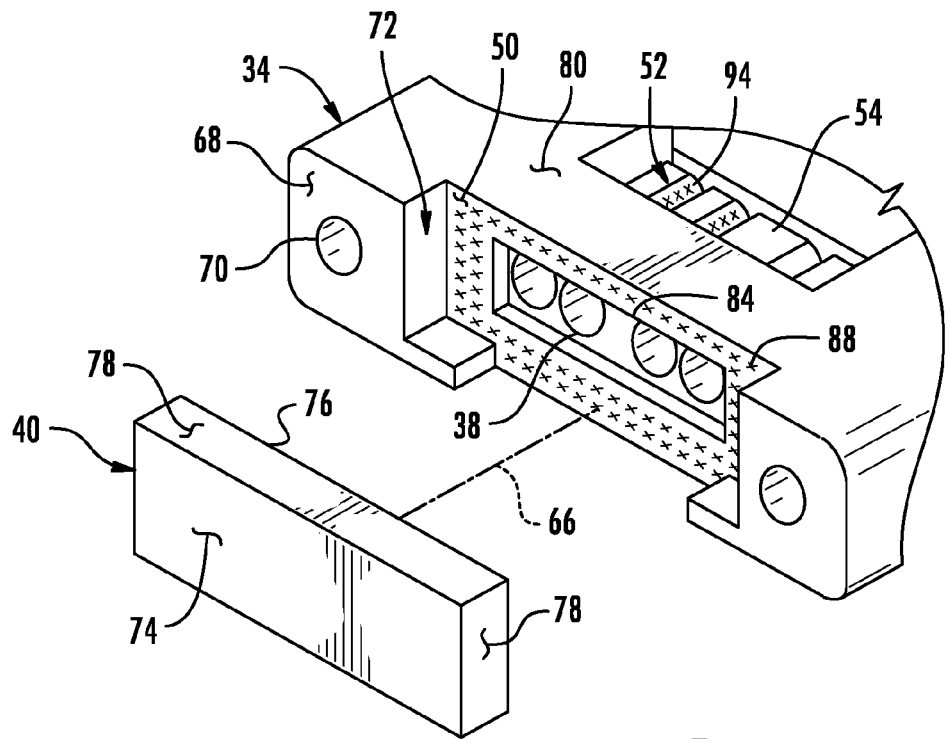
FIG. 5 is an enlarged view the area noted in FIG. 3A.

With this in mind, reference can now be made to FIG. 5, which illustrates a portion of the ferrule 34 and the window 40 in further detail. The ferrule 34 extends along a longitudinal axis 66 and includes a front surface 68 extending in a transverse plane relative to the longitudinal axis 66. The front surface 68 may include one or more mechanical alignment features 70, such as alignment bores or alignment pins, configured to cooperate with corresponding mechanical alignment features provided on the device to which the fiber optic connector 20 mates. The front surface 68 may additionally or alternatively include magnetic alignment features (not shown). Embodiments where the front surface 68 includes no mechanical or magnetic alignment features are also possible.

A recess 72 is provided in the front surface 68 to accommodate the window 40. Stated differently, the forward-facing surface 50 of the ferrule 34 is recessed relative to the front surface 68 to define a cavity/pocket/recess 72 for the window 40. The forward-facing surface 50 also extends in a plane transverse to the longitudinal axis 66. Such a configuration allows the window 40, which in the embodiment shown is generally prismatic with substantially parallel front and rear surfaces 74, 76, to be substantially co-planar with the front surface 68. The recess 72 may also be configured so that one or more side surfaces 78 of the window 40 that extend between the front and rear surfaces 74, 76 are substantially co-planar with one or more side surfaces 80 of the ferrule 34. A top side surface 78 of the window 40 is shown as being substantially co-planar with a top side surface 80 of the ferrule 34 in the illustrative embodiment.

The window 40 overlays a footprint area defined on the forward-facing surface 50, which includes the region where adhesive is applied to couple the window 40 to the ferrule 34. The footprint area covers much of the forward-facing surface 50 in the embodiment shown, but may be less co-extensive or more co-extensive (and even substantially/entirely co-extensive) with the forward facing surface 50 in other embodiments. An opening 84 is provided in the forward-facing surface 50 so that the air gap is maintained between the window 40 and the lens elements 38, as mentioned above.

The adhesive may be applied to some or substantially all of the footprint area. The adhesive may also be applied as droplets that form a continuous or discontinuous pattern on the forward-facing surface 50. For example, the adhesive may be applied to form a continuous bead around the opening 84 in the footprint area. Such a bead is generally desirable to help ensure sufficient bonding of the window 40 to the ferrule 34. Additionally, such a bead helps ensure consistent bonding to allow accurate positioning of the window 40 and to seal off the air gap/cavity between the window 40 and the lens elements 38.

Generally speaking, the presence of at least some adhesive between the window 40 and the forward-facing surface 50 means that a gap thickness exists between the rear surface 76 of the window 40 and the forward-facing surface 50 of the ferrule 34. FIG. 5 schematically illustrates the footprint area being textured to accommodate volumes of the adhesive, thereby allowing a smaller gap thickness without adhesive "spilling over" (i.e., being pushed or migrating from) the footprint area. Thus, the texturing on the forward-facing surface 50 represents formations 88 that enable the forward-facing surface 50 to accommodate greater volumes of adhesive compared to a non-textured surface. The formations 88 may be, for example, recessed formations machined on the forward-facing surface 50 or, if the ferrule is a molded component, formed during the molding operation. The recessed formations 88 may be distributed on substantially all of the footprint area (and, in some embodiments, on substantially the entire forward-facing surface 50), or on just some regions of the footprint area.

Figure 6:
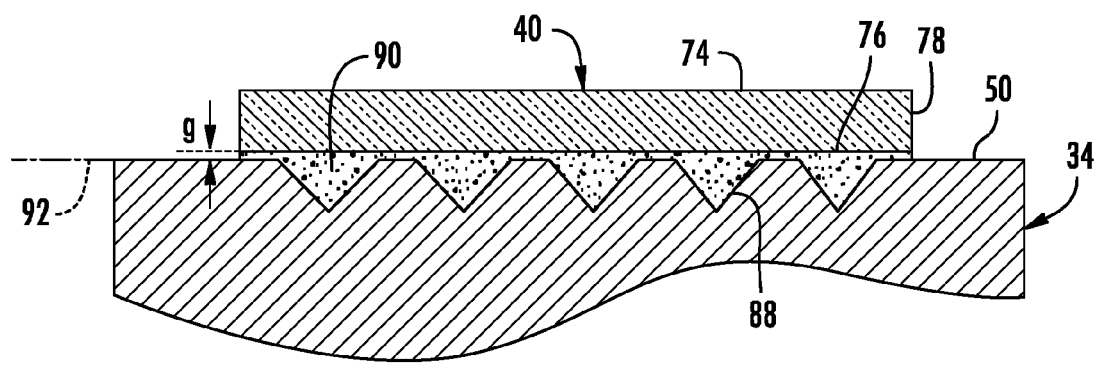
FIG. 6 is a schematic view of a portion of the fiber optic connector depicted in FIG. 2.

FIG. 6 schematically illustrates a portion of the interface between the window 40 and ferrule 34 to better appreciate one example of texturing on the forward-facing surface 50. In the example, the texturing comprises recessed formations 88 each having a v-shaped cross-section. The recessed formations 88 may be a plurality of grooves in the footprint area having the v-shaped cross-section. Alternatively, the recessed formations 88 may be a plurality of pyramid or cone-shaped wells/indentations on the forward-facing surface 50. Other embodiments may involve different shapes of recessed formations, with each recessed formation having the same shape or there being a combination of differently-shaped formations.

As can be seen in FIG. 6, the recessed formations 88 accommodate some of the volume of adhesive 90 used to couple the window 40 to the ferrule 34. This enables a gap thickness g defined between the window 40 and the transverse plane 92 to be minimized or at least reduced for a given volume of the adhesive 90. Stated another way, for a given gap thickness that is to be maintained to properly position the window 40 based on the design of the optical system, the volume of adhesive used to couple the window 40 to the ferrule 34 can be greater. The volume includes not only the volume defined between the window 40 and the transverse plane 92 (i.e., the product of the gap thickness g and the footprint area), but also the volume accommodated by the recessed formations 88. If the forward-facing surface 50 was not textured, the volume of the adhesive that could be applied without spilling over from the footprint area would be limited to the former.

Accommodating a greater volume of adhesive provides several benefits. For example, the increased volume helps address some of the challenges associated with adhesive dispensing technology. Adhesive dispensers may be limited to droplet sizes of approximately 2 nanoliters (nL), which may result in a volume of adhesive that cannot be contained in the footprint area for an acceptable gap thickness. Texturing the forward-facing surface 50 in the manner described above allows such adhesive dispensers to be used in these situations. In essence, the texturing effectively decreases the resolution required from the adhesive dispenser.

In these and other situations, spill-over from the footprint area is reduced or eliminated. This, in turn, reduces or eliminates the likelihood of adhesive being displaced into the air gap between the window 40 and the lens elements 38 and interfering with the optical path of the expanded beams. Additionally, in embodiments like the one shown where one of the side surfaces 78 of the window 40 is substantially co-planar with one of the side surfaces 80 of the ferrule 34, reducing or eliminating spill-over helps ensure that the substantially co-planar surfaces are substantially flush. As used herein, the term "flush" refers to surfaces extending in a plane not crossed by adhesive. The substantially co-planar side surfaces being substantially flush helps ensure/facilitate inserting the fiber optic module 28 (FIGS. 2-4B) into the plug housing 30. There are no bulges or amounts of adhesive on the outside of the fiber optic module 28 that may interfere with the insertion. Similar advantages may be provided in embodiments where the ferrule 34 is not contained within a plug housing 30 but is closely received in a receptacle or housing of a mating component.

Now referring back to FIG. 5, the ferrule 34 may include other surfaces textured to accommodate adhesive. The fiber support features 52 (v-shaped grooves in the embodiment shown), for example, may include one or more surfaces 94 that are textured to accommodate the adhesive that couples the fiber cores 56 (FIGS. 3A-4B) to the ferrule 34. The advantages of doing so may be similar to texturing the forward-facing surface 50 of the ferrule 34 in that it helps address some of the challenges associated with adhesive dispensing technology. In particular, the fiber cores 56 should be precisely positioned on the fiber support features 52 so that the desired optical paths can be properly established with the lens elements 38. This includes positioning the fiber cores 56 in the plane transverse to the optical paths (i.e., x and y-directions) and axially along the optical paths (i.e., z-direction) so that the fiber ends 46 contact or nearly contact a fiber-end datum surface 96. It is also desirable to apply the adhesive to the fiber support features 52 before positioning the fiber cores 56 thereon to ensure that sufficient adhesive is placed between the fiber cores 56 and fiber support features 52 to provide a strong connection. When doing so, however, accurately positioning the fiber cores 56 can be difficult and impractical because some adhesive dispensers do not have sufficient resolution to limit adhesive to desired areas. Adhesive applied to one of the fiber support features 52 for one of the fiber cores 56 may spill over to neighboring fiber support features 52. If adhesive is then applied to the neighboring fiber support features 52, the result may be a greater amount of adhesive than intended. This may result in further spill-over, making the overall distribution of adhesive on the fiber support features 52 difficult to predict, and/or result in excess adhesive in a localized area so as to interfere with the desired positioning of the fiber core 56.

By texturing one or more surfaces 94 of the fiber support features 52, a greater volume of adhesive may be accommodated without the above-mentioned effects. Thus, adhesive may be applied to individual fiber support features 52 by adhesive dispensers that normally (i.e., when the fiber support features 52 do not have textured surfaces) would be considered as not having sufficient resolution to do so. As with texturing the forward-facing surface 50 of the ferrule 34, texturing the fiber support features 52 effectively decreases the resolution required from the adhesive dispenser.

It should be noted that fiber support features may be provided on the fiber tray 42 as well. In the embodiment of FIGS. 3A-4B, for example, the fiber tray 42 includes fiber support features 98 in the form of u-shaped grooves that each receive and position a non-stripped portion of one of the optical fibers 36 (i.e., a portion where the coating 58 is still present). Texturing surfaces on the fiber support features 98 is also a possibility. As such, the discussion above about texturing the fiber support features 52 and the associated benefits may be equally applicable to the fiber support features 98.

The fiber tray 42 itself is mentioned above as being another example of a component coupled to the ferrule 34 by adhesive. Accordingly, embodiments will be appreciated where the fiber tray recess 44 is textured for purposes similar to that mentioned above for the other examples. Other examples and embodiments involving different configurations will also be readily apparent to persons skilled in the technical field of fiber optic connectors.

Figure 7:
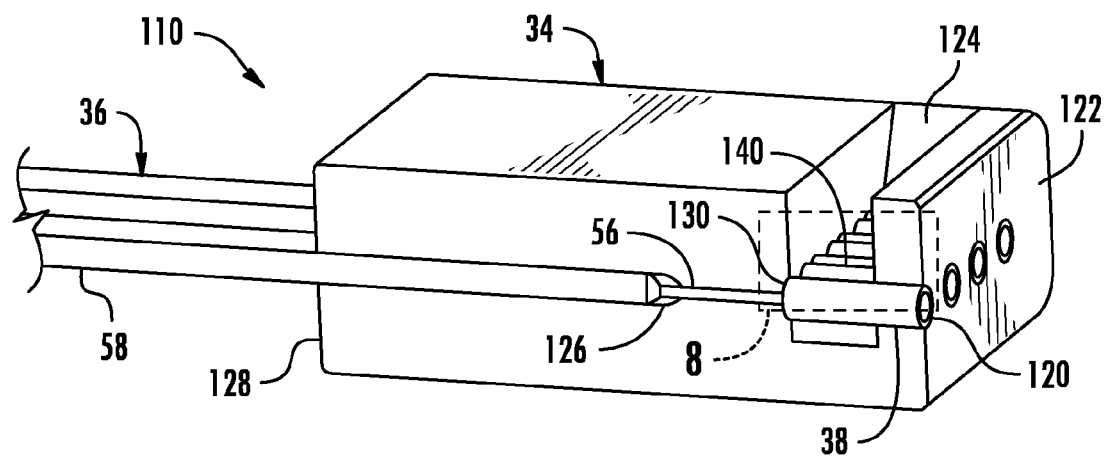
FIG. 7 is a perspective view, partially cut away, of a portion of a fiber optic connector according to an alternative embodiment.
Figure 8:
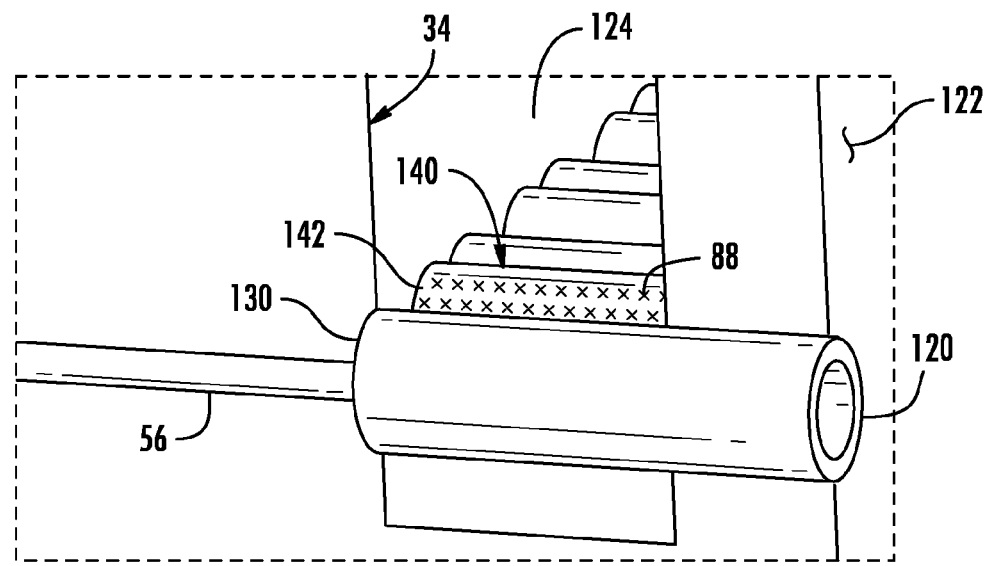
FIG. 8 is an enlarged view of the area noted in FIG. 7.

To illustrate this point, FIGS. 7 and 8 depict a portion of a fiber optic connector 110 according to an alternative embodiment. The fiber optic connector 100 still includes a ferrule 34 and a plurality of lens elements 38, but in this embodiment the lens elements 38 are gradient refractive index (GRIN) lenses in the form of glass rods. The lens elements 38 each include a first lens surface 120 substantially flush with a forward-facing surface 122 of the ferrule 34 and extend rearwardly into an inner chamber 124 provided in the ferrule 34. Fiber cores 56 that have been inserted through a bore 126 extending from a rear surface 128 of the ferrule 34 are each brought into contact with or close proximity to a second lens surface 130 of one of the lens elements 38 so that the components may be optically coupled.

In the embodiment shown in FIGS. 7 and 8, the lens elements 38 are supported by groove alignment features 140 within the inner chamber 124. The groove alignment features 140, which may be v-shaped grooves (as shown) or u-shaped grooves in some embodiments, are similar to the fiber alignment features 52 discussed above in that they are used to help properly position a component in the associated optical path. Additionally, the component being positioned (GRIN lenses in this embodiment) may be coupled to the groove alignment features 140 with an adhesive, such as an index matching gel or epoxy. To this end, one or more surfaces 142 of the groove alignment features 140 may be textured, as schematically shown in FIG. 8, for reasons similar to those mentioned above for the fiber support features 52. Principles and advantage discussed above may, therefore, be equally applicable to the embodiment shown in FIGS. 7 and 8.

It will be apparent to those skilled in the art that various modifications and variations can be made without departing from the spirit or scope of the specification. Since modifications combinations, sub-combinations and variations of the disclosed embodiments incorporating the spirit and substance of the specification may occur to persons skilled in the art, the specification should be construed to include everything within the scope of the appended claims and their equivalents.

What is claimed is:

1. A fiber optic connector for a cable having a plurality of optical fibers, the fiber optic connector comprising:
    a ferrule comprising a plurality of u-shaped or v-shaped grooves configured to receive and support an exposed core of the plurality of optical fibers, and a first plurality of recessed formations formed within at least a portion of the plurality of u-shaped or v-shaped fiber support features, wherein the plurality of optical fibers are secured within the plurality of u-shaped or v-shaped grooves by an adhesive such that the adhesive within an individual u-shaped or v-shaped groove does not migrate into a neighboring u-shaped or v-shaped groove;
    at least one lens element positioned on the ferrule;
    and at least one component coupled to a surface of the ferrule by an adhesive, the at least one component being a window coupled to a forward-facing surface of the ferrule by the adhesive;
    wherein the at least one component overlays a footprint area defined on the surface to which the adhesive is applied, the surface having a second plurality of recessed formations within the footprint area, and the at least one lens element of the ferrule being recessed from the forward-facing surface so that an air gap is provided between the at least one lens element and the window.

2. The fiber optic connector of claim 1, wherein the second plurality of recessed formations are distributed on substantially the entire footprint area.

3. The fiber optic connector of claim 1, wherein:
    the forward-facing surface of the ferrule extends in a transverse plane relative to a longitudinal axis along which the ferrule extends;
    a gap thickness is defined between the window and the transverse plane; and
    the volume of adhesive coupling the window to the forward-facing surface is greater than a volume defined by the product of the gap thickness and the footprint area.

4. The fiber optic connector of claim 1, wherein the window is prismatic with opposed front and rear surfaces extending between a plurality of side surfaces, and further wherein at least one of the side surfaces of the window is substantially co-planar with a side surface of the ferrule.

5. The fiber optic connector of claim 4, wherein the second plurality of recessed formations on the forward-facing surface of the ferrule are formed in a region of the footprint area proximate the side surface of the ferrule that is substantially co-planar with at least one side surface of the window.

6. The fiber optic connector of claim 1, wherein the adhesive forms a continuous bead on the forward-facing surface around an opening to the air gap.

7. The fiber optic connector of claim 1, wherein the at least one component comprises one or more gradient refractive index (GRIN) lenses.

8. The fiber optic connector of claim 1, wherein the second plurality of recessed formations comprises a plurality of pyramid or cone-shaped wells formed in the footprint area.

9. An optical cable assembly, comprising:
  a cable having one or more optical fibers carried within a jacket; and
  a fiber optic connector according to claim 1 coupled to an end of the cable.

10. A method of assembling a fiber optic assembly including a fiber optic connector according to claim 1, the method comprising:
  providing the ferrule of the fiber optic connector;
  applying the adhesive to the surface of the ferrule; and
  coupling the at least one component to the at least one surface with the adhesive.

11. The method of claim 10, wherein applying the adhesive comprises dispensing droplets of the adhesive having a volume of approximately 2 nanoliters or larger.

12. A fiber optic connector for a cable having a plurality of optical fibers, the fiber optic connector comprising:
  a ferrule comprising:
    a first plurality of u-shaped or v-shaped fiber support features configured to receive and support an exposed core of the plurality of optical fibers, and a first plurality of recessed formations formed within at least a portion of the plurality of u-shaped or v-shaped fiber support features, wherein the plurality of optical fibers are secured within the plurality of u-shaped or v-shaped grooves by an adhesive such that the adhesive within an individual u-shaped or v-shaped groove does not migrate into a neighboring u-shaped or v-shaped groove;
    a fiber tray recess;
    a second plurality of recessed formations within at least a portion of the fiber tray recess;
    a front surface;
    a recess within the front surface extending in a transverse plane relative to a longitudinal axis along which the ferrule extend, the recess defining a forward-facing surface that is recessed relative to the front surface; and
    a third plurality of recessed formations within at least a portion of the forward-facing surface;
  a fiber tray coupled to the ferrule by an adhesive disposed between the fiber tray and the fiber tray recess; and
  a window coupled to the forward-facing surface of the ferrule by an adhesive.

13. The fiber optic connector of claim 12, wherein
  a gap thickness is defined between the window and the transverse plane; and
  the volume of adhesive coupling the window to the forward-facing surface is greater than a volume defined by the product of the gap thickness and the footprint area.

14. The fiber optic connector of claim 12, wherein the ferrule comprises at least one lens element, the at least one lens element being recessed from the forward-facing surface so that an air gap is provided between the at least one lens element and the window.

15. The fiber optic connector of claim 12, wherein the fiber tray further comprises:
  a second plurality of fiber support features; and
  a fourth plurality of recessed formations disposed on at least a portion of the second plurality of fiber support features.

* * * * *